Figure 1:
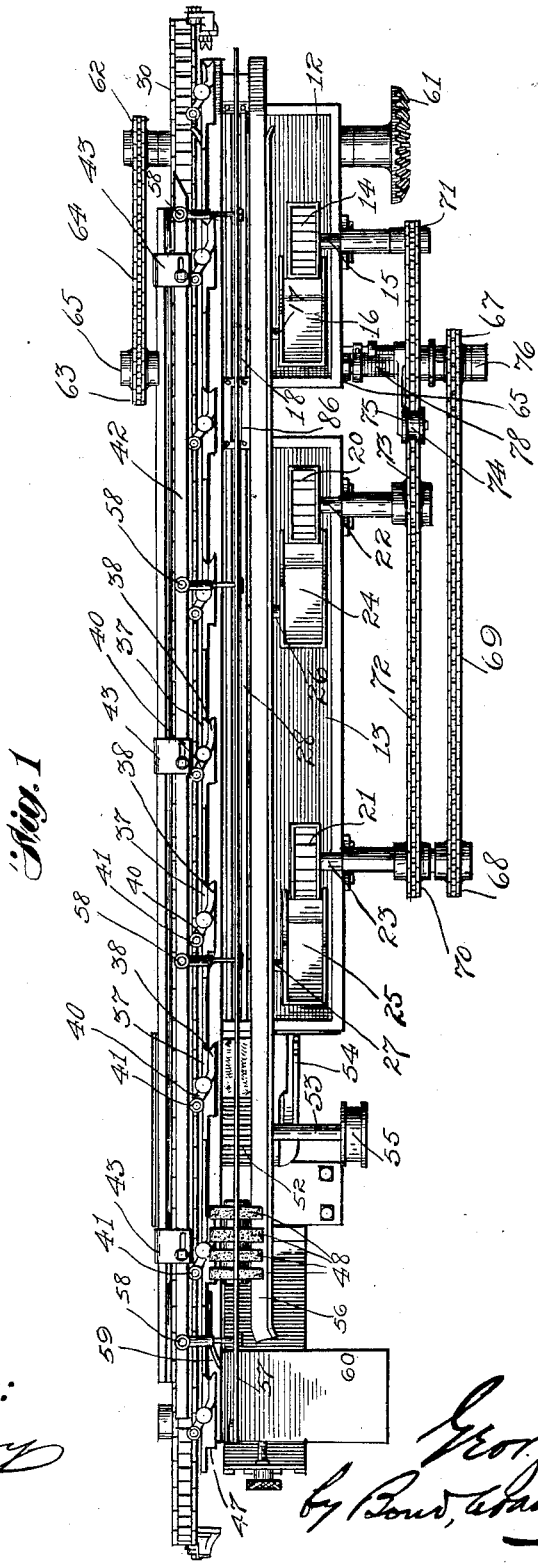

No. 732,005. PATENTED JUNE 23, 1903.
G. F. LEIGER.
CAN BODY SOLDERING MACHINE.
APPLICATION FILED NOV. 20, 1902.
NO MODEL. 5 SHEETS—SHEET 1.

Witnesses:
Inventor:
George F. Leiger

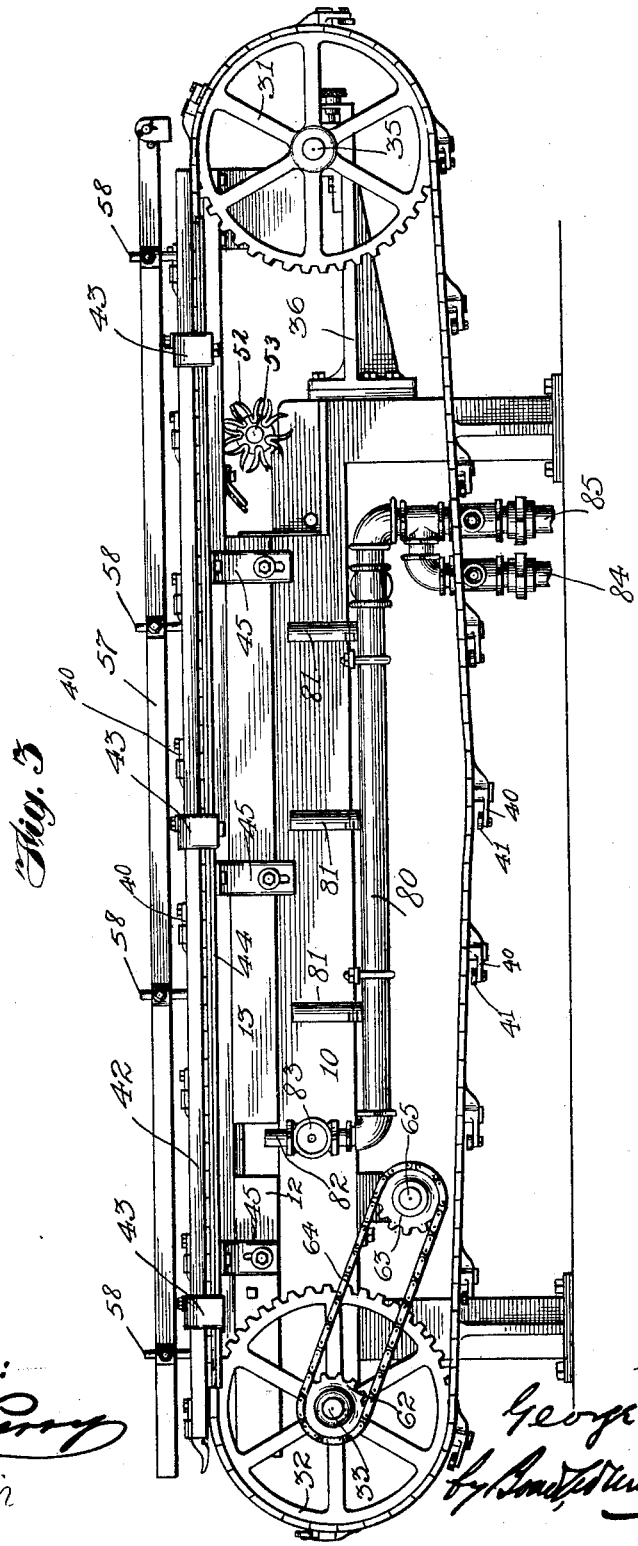

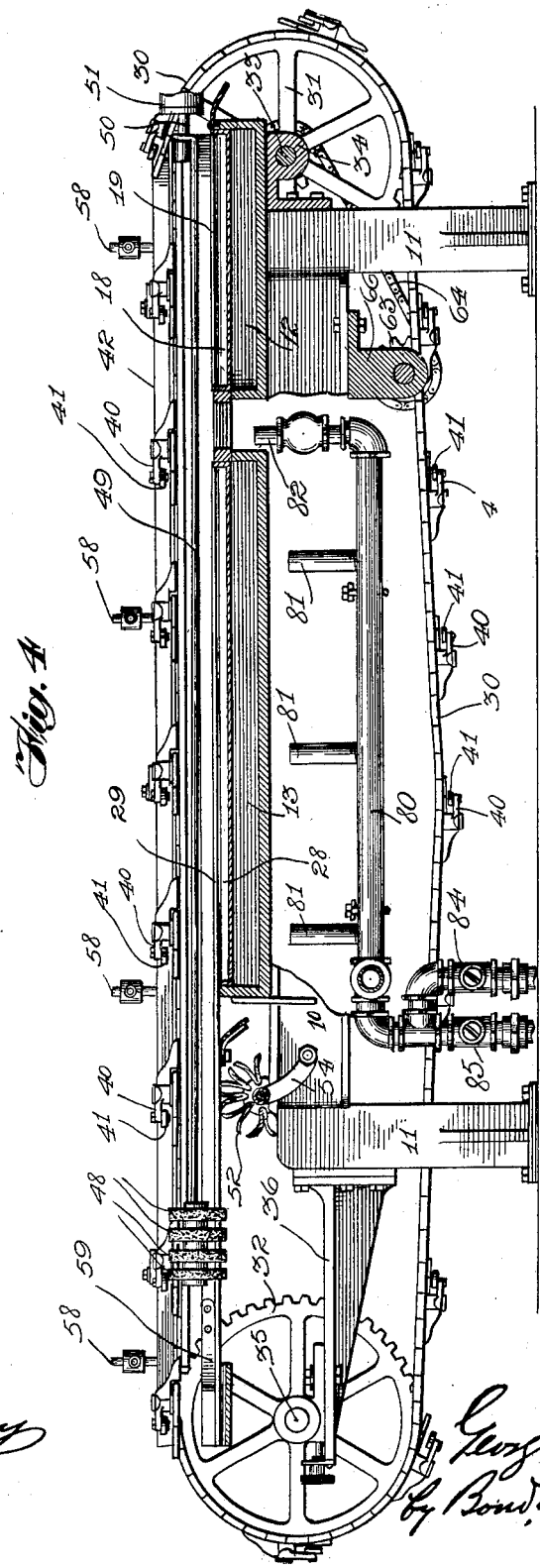

No. 732,005. PATENTED JUNE 23, 1903.
G. F. LEIGER.
CAN BODY SOLDERING MACHINE.
APPLICATION FILED NOV. 20, 1902.
NO MODEL. 5 SHEETS—SHEET 5.
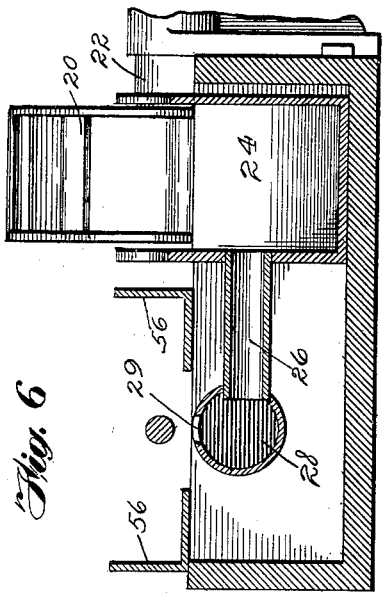
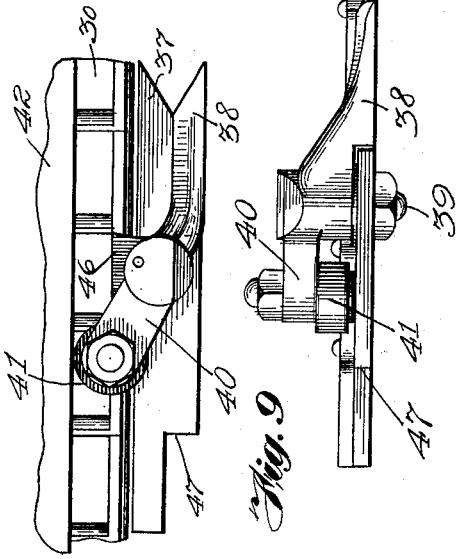
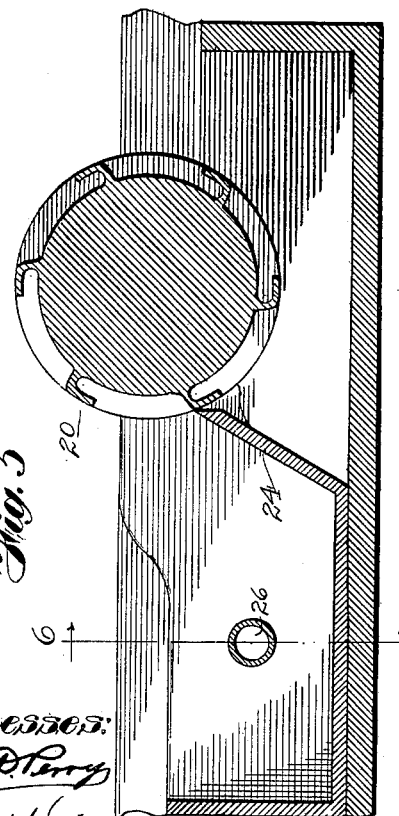
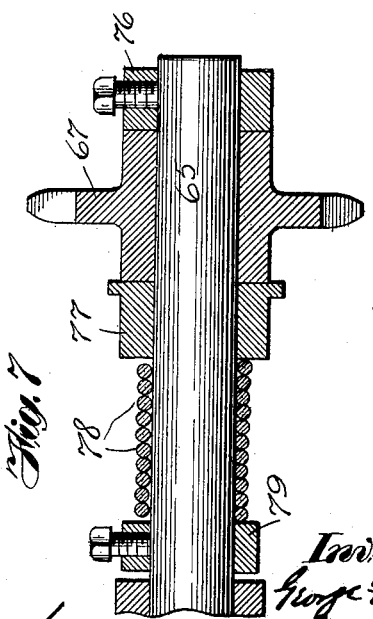

No. 732,005. Patented June 23, 1903.

UNITED STATES PATENT OFFICE.

GEORGE F. LEIGER, OF CHICAGO, ILLINOIS, ASSIGNOR OF THREE-FOURTHS TO LEWIS BENEDICT, OF CHICAGO, ILLINOIS.

CAN-BODY-SOLDERING MACHINE.

SPECIFICATION forming part of Letters Patent No. 732,005, dated June 23, 1903.

Application filed November 20, 1902. Serial No. 132,055. (No model.)

*To all whom it may concern:*

Be it known that I, GEORGE F. LEIGER, a citizen of the United States, residing at Chicago, in the county of Cook and State of Illinois, have invented certain new and useful Improvements in Can-Body-Soldering Machines, of which the following is a specification, reference being had to the accompanying drawings.

This invention relates to improvements in machines for soldering can-bodies, and particularly to machines of the character set forth in my pending application, filed January 27, 1902, Serial No. 91,475, of the series of 1900.

The objects of my present invention are to provide improved means for clamping and holding a can-body while such can-body is being drawn lengthwise of the machine for the purpose of having solder properly applied thereto, to provide means for preventing breakage of or damage to the machine in case said machine is put in operation while the solder in the trough is in a solidified condition, to provide improved means for discharging soldered can-bodies from the machine, and to improve generally the construction and operation of machines of this character. I accomplish these objects as hereinafter specified and as illustrated in the drawings.

That which I regard as new will be set forth in the claims.

Figure 2:
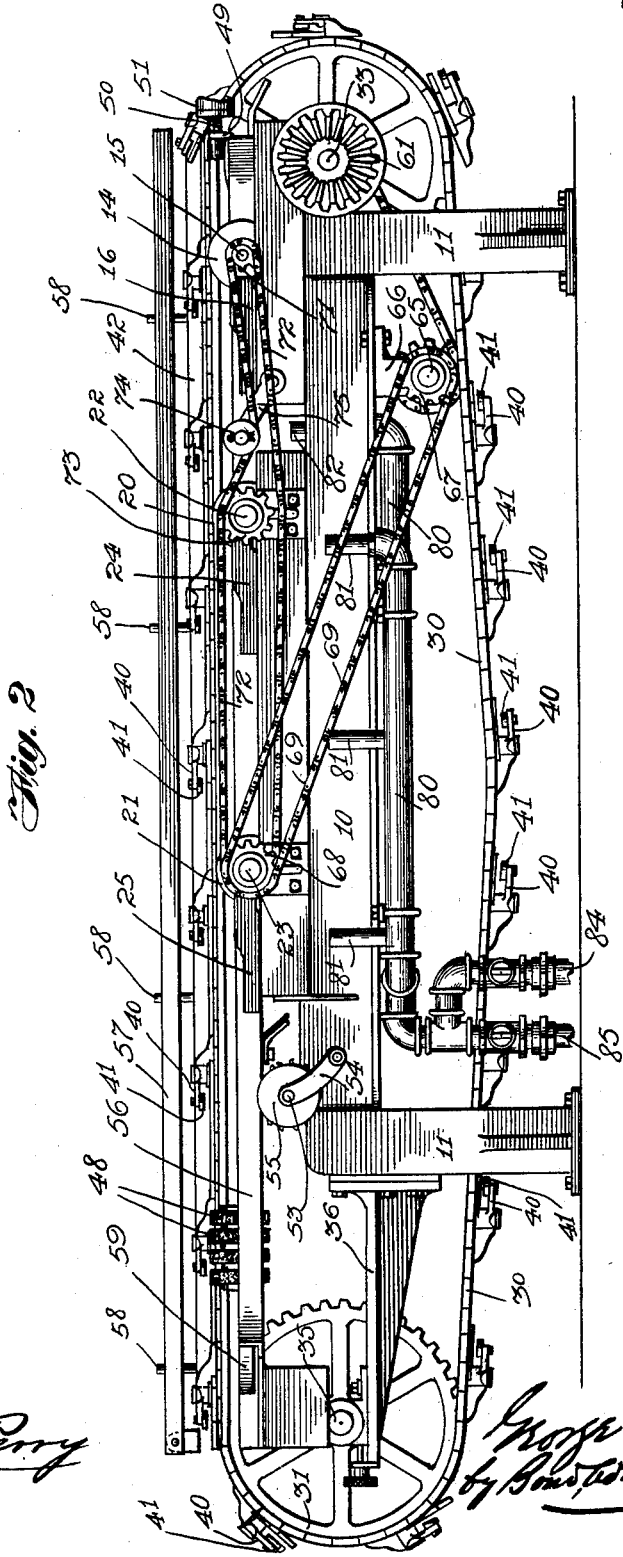

In the accompanying drawings, Figure 1 is a plan view. Fig. 2 is a side elevation. Fig. 3 is a view similar to Fig. 2, taken from the opposite side of the machine to that shown in Fig. 2. Fig. 4 is a longitudinal vertical section, some parts being shown in elevation. Fig. 5 is a detail, being a longitudinal section through a portion of the solder-trough and one of the solder-lifting wheels therein. Fig. 6 is a section at line 6 6 of Fig. 5. Fig. 7 is a detail showing the arrangement of devices for preventing damage to the machine or any of its parts in case power is applied to the machine when the solder in the solder-trough is in a solid condition. Fig. 8 is a detail, being a top or plan view of one of the can-body-clamping devices attached to the endless carrier-chain; and Fig. 9 is a side elevation of the parts shown in Fig. 8.

Referring to the drawings, 10 indicates the central portion of the main frame, upon which the operating devices are carried, said main frame being, as shown in the drawings, supported at its ends by suitable standards 11 11.

12 indicates a trough adapted to contain a suitable acid to be applied previous to soldering to that portion of the can to which solder is to be applied. 13 indicates another, but larger, trough adapted to contain solder. The two troughs 12 and 13, as shown, are separated from each other, into the space between which projects a gas-burner, as hereinafter referred to.

14 indicates a wheel mounted on one end of a stub-shaft 15, that projects through one of the side walls of the acid-containing trough 12, the acid lifted by said wheel when the wheel is rotated being dumped into the open upper end of a receptacle 16, from whence it is conducted by a short pipe 17 to a section of pipe 18, that is closed at both ends and is provided in its upper portion with a longitudinally-extending slot 19. The wheel 14, receptacle 16, and pipes 17 and 18 are all located within the acid-containing trough 12.

Within the trough 13, which is adapted to contain solder, are located in the construction shown two lifting-wheels 20 21, secured, respectively, on the inner ends of stub-shafts 22 23, that project through one of the side walls of the trough 13. These lifting-wheels 20 21 upon their rotation lift small quantities of melted solder from the trough 13 and discharge, respectively, into receptacles 24 25, from which the solder flows through short pipes 26 27 to a comparatively long pipe 28, that is in line with the pipe 18 and like such pipe 18 is provided in its upper portion with a longitudinal slot, said last-named slot being indicated by 29.

30 indicates an endless carrier composed in the construction shown of a chain of links, such chain passing around suitable sprocket-wheels 31 32, located at opposite ends of the machine, the wheel 31 in the form of construction shown having its axle 33 journaled in suitable bearings 34, bolted to the frame of the machine, and the wheel 32 having its axle 35 suitably journaled in bearings carried on a bracket 36, extending out from the frame of the machine. The wheel 32, as shown, is provided with means for adjusting it farther from or closer to the frame of the machine, as will be well understood.

The endless carrier 30 is provided at regular intervals with a number of clamping devices adapted to clamp and securely hold a sheet-metal can-body, each of said clamping devices consisting of a pair of jaws 37 38, the jaw 37 lying parallel with and adjacent to the endless carrier 30 and provided between its ends with a vertical pivot 39, upon which the jaw 38 is mounted. The jaw 38 is provided with an arm 40, near the end of which is mounted a roller 41, that rolls in contact when a can-body is being carried with the side face of a longitudinally-extending strip 42, such strip lying over the endless carrier, as clearly shown in Fig. 1. The strip 42 is so arranged with relation to the endless carrier that when the rollers 41 are in contact with such strip the jaw 38 will be turned on its pivot, so as to firmly clamp and hold a can-body that has been by any suitable mechanism inserted between such jaws prior to the contact of the roller 41 with the side of the longitudinal strip 42. In the construction shown this longitudinal strip 42 is secured in place by rigid brackets 43, that are suitably secured to a flat bar 44, extending longitudinally of the machine between the two sprocket-wheels 31 32 and which bar forms a horizontal support for the carrier, such supporting-bar 44 being in turn supported by suitable brackets 45, bolted to one of the sides of the troughs 12 and 13. (See Fig. 3.)

Referring again to the clamping-jaws by which a can-body is gripped and carried along with the carrier, it will be seen that the fixed jaw 37, which is secured to the endless carrier by a plate 46, extends quite a distance forward of the pivot 39 by which the jaw 38 is connected to it, and such extra length is for the purpose of acting as a positive stop to prevent the complete accidental retraction of a can-body from the preceding pair of jaws if for any reason such preceding pair of jaws should fail to properly clamp and hold the can-body inserted therein, and it will also be noted that on the forward end of such stationary jaw 37 the material is cut away to form a shoulder 47, such shoulder receiving the rear edge of a can-body in case such can-body for any reason slips from the preceding pair of jaws and prevents such can-body from entirely leaving its jaws. This provision of making each clamping device act as a positive stop for a can escaping from the preceding clamping device insures every can-body delivered to the machine being properly carried through the machine, so as to be properly operated upon, although with the parts in proper condition each clamping device will ordinarily so firmly hold a can-body between its pair of jaws as not to require the use of the next-succeeding clamping device to assist in the manner described.

48 indicates a swab cylindrical in shape in the construction shown and of a size to closely fill and press against the interior face of a can-body, such swab being located near the discharge end of the machine and carried at one end of a rod 49, the other end of such rod being secured in any suitable manner, so as to permit the formed, but unsoldered, can-bodies to pass over it when they are fed to the clamping-jaws 37 38, carried by the carrier 30. In the construction shown (see Fig. 4) the end of this rod 49 is secured to one end of a shaft 50, on which slides a cylindrical head 51, adapted through suitable mechanism to push the unsoldered can-bodies between the clamping-jaws 37 and 38. The means for feeding the unsoldered can-bodies to the machine, however, form no part of my present invention, and only so much thereof is illustrated as is necessary to show a proper connection for the rod 49, that carries the swab.

52 indicates a rotary brush located just forward of the solder-containing tank 13 and mounted on one end of a shaft 53, that is supported by an arm 54, adjustably secured to the main frame 10, such shaft being driven through a pulley 55, mounted on its outer end, over which a suitable driving-belt is adapted to pass. The supporting-arm 54 is made adjustable, so that as the rotary brush 52 wears from use it can be raised from time to time, so as always to properly contact with the under sides of the can-bodies, such can-bodies being of course suitably soldered by the time they reach this brush, and such brush acts, as will be well understood, to remove from the outside of the can any surplus solder along the seam, while the swab 48 will perform a like office on the interior of the can.

The cans are properly supported on the machine while being carried therethrough by the endless carrier 30 by two angle-bars 56 and an upper bar 57, such upper bar 57 being placed, substantially, over the longitudinal slots in the pipes 18 and 28 and being vertically adjustable upon short posts 58, secured to the bar 42. The angle-bars 56, forming the lower portion of the guide, are secured, as shown, on top of the troughs 12 and 13 at equal distances from the center of the alined pipes 18 and 28, a considerable space being left between them, so as to permit the can-bodies to properly contact the acid and solder that rise up in the said pipes 18 and 28 and overflow through the longitudinal slots therein, as fully set forth in my said pending application.

59 indicates a flat spring secured to one of the angle-bars 56 near the discharge end of the machine, such spring having its free forward end curved outward, so that as a can-body is released from its clamping-jaws 37 38 by reason of the wheel passing the end of the bar 42 such spring 59 will throw the can sidewise upon a lateral discharge-chute 60.

Upon one end of the shaft 33 is suitably secured a beveled gear 61, with which is adapted to mesh another beveled gear, (not shown,) through which the machine is driven. This beveled gear 61 is shown, as it is by means of that description, in connection with the other beveled gear referred to on the end of a suitable shaft, that the machine as I have constructed it is operated from and in connection with a machine for forming can-bodies; but it is evident that the machine could be operated independently of such can-body-forming machine and other well-known means employed for transmitting power instead of that shown and described. On the other end of the shaft 33 is suitably secured a sprocket-wheel 62, (see Figs. 1 and 3,) over which sprocket-wheel and over a corresponding sprocket-wheel 63 passes a drive-chain 64, mounted on one end of an axle 65, secured in suitable bearings below the main frame 10, the bearings for such shaft 65 being in downwardly-projecting brackets 66, bolted to the under side of the frame 10. On the end of said shaft 65 opposite to the end carrying the sprocket-wheel 63 is located another sprocket-wheel 67, over which and over a similar sprocket-wheel 68, secured on the outer end of the stub-shaft 23, passes a drive-chain 69. On the same stub-shaft 23 is located another sprocket-wheel 70, over which and over another sprocket-wheel 71 on the stub-shaft 15 passes a sprocket-chain 72, said sprocket-chain 72 also engaging a sprocket-wheel 73 on the stub-shaft 22, such last-named chain being held in proper engagement with the sprocket-wheel 73 by a suitable pressure-roller 74, carried on one end of a pivoted arm 75.

When the machine is in motion, it will be evident that through the gearing described the several lifting-wheels 14, 20, and 21 will be properly operated. It will also be evident that in case the solder in the trough 13 should not be in a molten condition at the time of starting the machine the lifting-wheels 20 and 21 would be held fast and much damage to various parts of the machine be thereby caused if some means be not provided for releasing the strain on the driving mechanism. To obviate any danger of such damage in such an event, I do not make the sprocket-wheel 67 fast to its shaft 65, but leave it free to turn thereon under abnormal conditions. As shown most clearly in Fig. 7, said sprocket-wheel 67 has secured to it near its outer end a collar 76, against the inner face of which one end of the hub of the sprocket-wheel 67 bears. Against the opposite face of the hub is a head 77, which is held in frictional engagement with the hub of the sprocket-wheel 67 by a coiled spring 78 around said shaft 65, the inner end of said coiled spring bearing against a collar 79, which is held firmly to the shaft. By this construction the sprocket-wheel 67 will under normal conditions—that is, when the solder in the trough 13 is in a molten condition—turn with the shaft 65; but in case the solder in such trough has not been sufficiently melted to permit the lifting-wheels 20 and 21 to turn readily the sprocket-wheel 67 will remain stationary, notwithstanding the turning of its shaft 65, and thus the gearing, the lifting-wheels, and attached parts will not be operated and danger of breakage will be obviated.

80 indicates two gas-pipes, one near each side of the machine and each provided at intervals with nipples 81, located directly below the solder-trough 13, so that the flame issuing from such nipples will be directed against the bottom of the trough and quickly heat the solder contained therein. One of these gas-pipes 80 is provided with another nipple 82, which, as shown, extends slightly up into the space between the troughs 12 and 13, so that the flame issuing therefrom will bear directly against the lower portion of a can-body as it passes from the acid-containing trough 12 to the solder-containing trough 13 and heat such can-body along its seam where the solder is to be applied. The nipple 82 is provided with a suitable valve 83, whereby the escape of gas through such nipple may be turned off when desired. Gas for the pipes 80 is supplied through a pipe 84, leading from a suitable source of supply, and air is mixed with such gas as it enters the pipe 80 through a suitable pipe 85.

In operation can-bodies are to be fed to the machine either automatically by suitable attachments to a can-body-making machine, as set forth in my said pending application, or otherwise, the seam of each can being downward as the can-body is fed in, so that there shall be properly applied to said seam acid and solder successively, for it will be understood that as the machine is operated the lifting-wheels will constantly discharge small quantities of acid and solder from their respective troughs into the receptacles in front of such wheels, from which the acid and solder will flow through the respective connecting-pipes 17 and 26 and 27 to the pipes 18 and 28 through the longitudinal slots in which the material will constantly overflow back into the troughs 12 and 13, and as the can-bodies are carried along by the several clamping devices on the endless carrier 30 the seams will be brought in contact with the acid and solder overflowing through such slotted pipes. As each can passes from over the acid-trough 12 to over the solder-trough 13 it will be subjected for a brief period of time to the flame issuing from the nipple 82, thus better preparing it to receive the solder, and, as explained in describing the construction of the wiping devices, the surplus solder on the outer part of the can-body will be wiped off by the rotary brush 52 and on the interior by the swab 48, over which swab the can-body passes. A portion of the space between the troughs 12 and 13 is, as shown in Fig. 1, bridged by a slotted plate 86, the slot therein being in line with the slots in the pipes 18 and 28. As the can-bodies are first presented for entrance to the machine, so as to properly fit in the guides formed by the angle-bars 56 and the upper bar 57, it will be evident from the arrangement of the clamping devices on the endless carrier 30 that a can-body may be entered between the jaws 37 and 38 of one of the clamping devices without being in any manner interfered with by the succeeding clamping device; but after a can has been so entered between such jaws and the carrier has advanced a short distance the succeeding clamping device will be brought up into position to move horizontally and will then be in position, as before described when explaining the construction of the clamping devices, to positively prevent the escape of the can-body from the preceding clamping device in case on account of wear or for any other reason the jaws 37 38 of such preceding clamping device should release their hold on the can-body sufficiently to allow it to partly escape therefrom. By thus constructing and arranging the clamping devices on the carrier a can-body is insured being taken through the machine in the proper manner, and all danger of a can-body becoming damaged or damaging any part of the machine on account of slipping out from the jaws 37 38 is entirely obviated. Shortly after a can-body passes over the swab 48 the roller 41 of the clamping device passes the end of the bar 42, allowing the movable jaw 38 to swing out slightly, so as to release the grip on the can-body, and the friction between the curved flat spring 59 and the can-body quickly releases such can-body from the jaws 37 38, and as such release is effected the force of the spring throws such can-body out from the machine upon a suitable chute, as 60.

By my invention I provide mechanism by which the side seams of can-bodies can be rapidly and thoroughly soldered with a minimum amount of material and that by reason of its construction obviates any danger of a can-body becoming loose in the machine and being damaged or causing damage to any portion of the machine and which is also provided with effective means for preventing any damage to the machine that might otherwise arise by carelessness on the part of the operator in starting the machine at a time when the solder in the trough 13 was not sufficiently heated to render it in a fluid condition.

That which I claim as my invention, and desire to secure by Letters Patent, is—

1. In a soldering-machine, the combination with a trough adapted to contain solder, of mechanism adapted to heat said solder, a device movable in said solder, means for driving said device, and other means for permitting a part of said driving means to remain stationary when the solder in the trough becomes solidified, and permitting the other part of said driving means to continue in operation, substantially as specified.

2. In a soldering-machine, the combination with a trough adapted to contain solder, of mechanism adapted to heat the solder, a wheel in said trough adapted to raise solder from the trough, mechanism for rotating said wheel while said solder is in a fluid condition, and means for permitting the movement of the wheel-rotating mechanism after the solder in the trough has become solidified, substantially as specified.

3. In a soldering-machine, the combination with a trough adapted to contain solder, of mechanism adapted to heat the solder in the trough, a wheel in said trough adapted to turn in the solder, a shaft projecting from said trough and on which said wheel is mounted, a drive-shaft, a sprocket-wheel loosely mounted thereon, means for normally holding said sprocket-wheel so that it will rotate with the drive-shaft, a sprocket-wheel on the said wheel-shaft, a chain passing over both of said sprocket-wheels, and means for driving said drive-shaft, substantially as specified.

4. In a can-soldering machine, the combination with a carrier and means for moving the same, of a series of can-clamping devices, each comprising a pair of jaws, means for closing said jaws when a can has been inserted therein, and each clamping device provided with a forward projection adapted to prevent the escape of a can from the preceding clamping device, substantially as specified.

5. In a can-soldering machine, the combination with a carrier and means for moving the same, of a series of can-clamping devices, each comprising a pair of jaws, one of said jaws being pivotally attached to the other and having an arm, a bar extending longitudinally of the machine and adapted to be contacted by the arms of the pivoted jaws to force the jaws of each clamping device to clamp a can between them, and means for releasing the cans so clamped, substantially as specified.

6. In a can-soldering machine, the combination with a carrier and means for moving the same, of a clamp connected with said carrier and adapted to hold a can, means for soldering said can while being moved by the carrier, and a spring near the discharge end of the machine adapted to be compressed by the moving can and act to discharge the can from the machine upon the release of the can from the clamp, substantially as specified.

7. In a can-soldering machine, the combination with a carrier and means for moving the same, of a clamp connected with said carrier and adapted to hold a can, means for soldering said can while being moved by the carrier, and a flat, curved spring adapted to bear against the side of the can and acting to withdraw the can from its clamp and when so withdrawn to discharge it from the machine, substantially as specified.

GEORGE F. LEIGER.

Witnesses:
JULIA M. BRISTOL,
HUGH C. PEARSON.